United States Patent Office 3,436,157
Patented Apr. 1, 1969

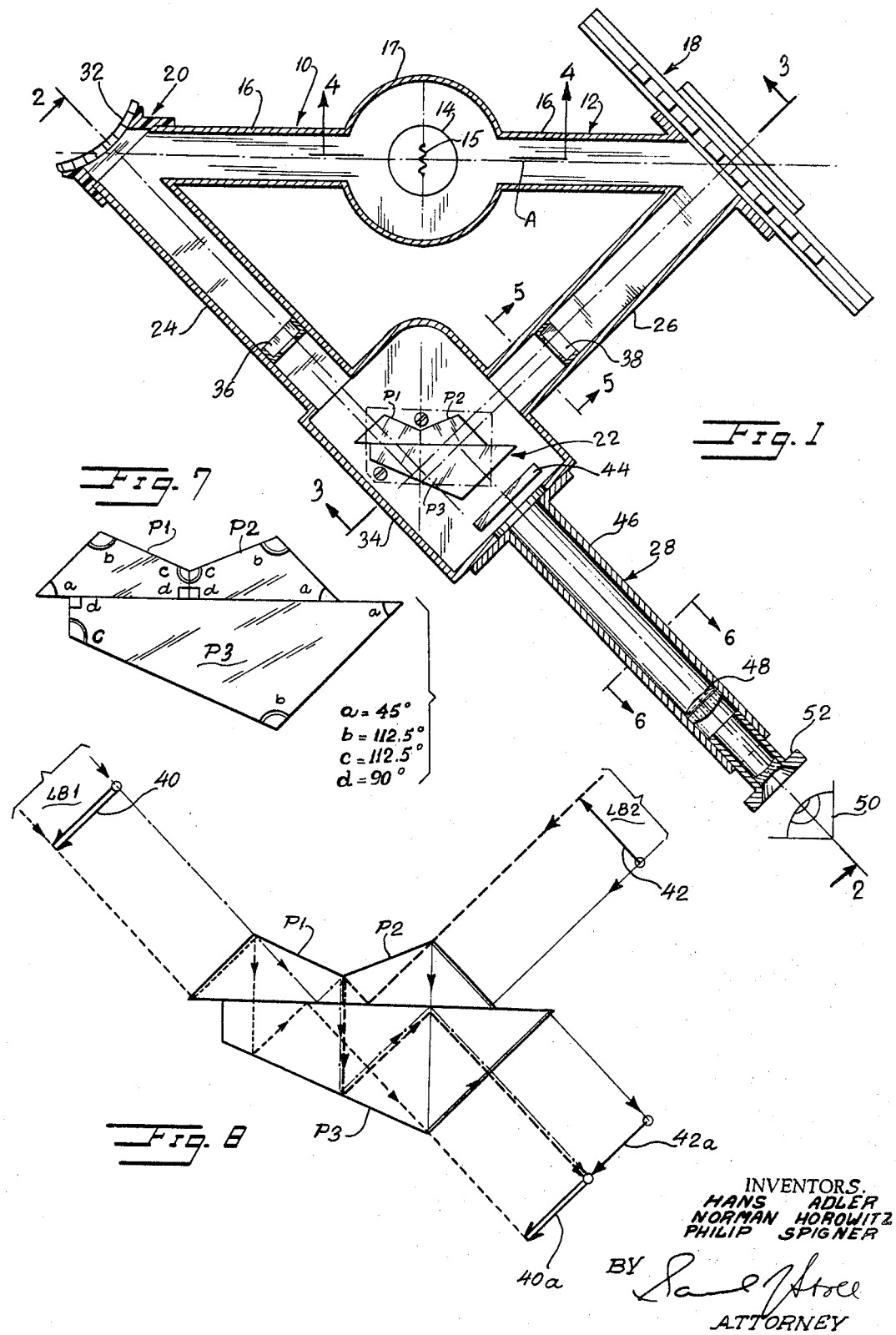

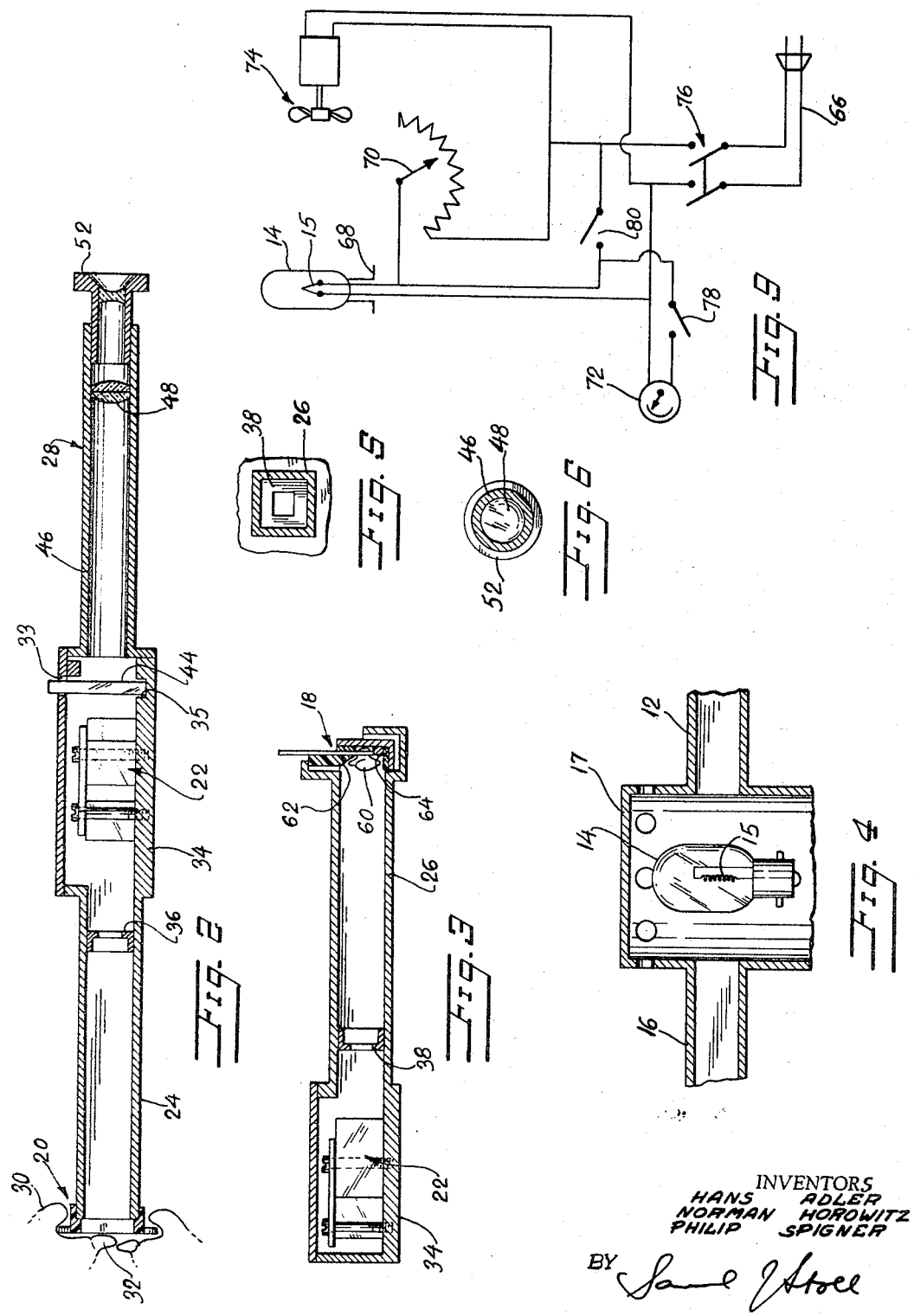

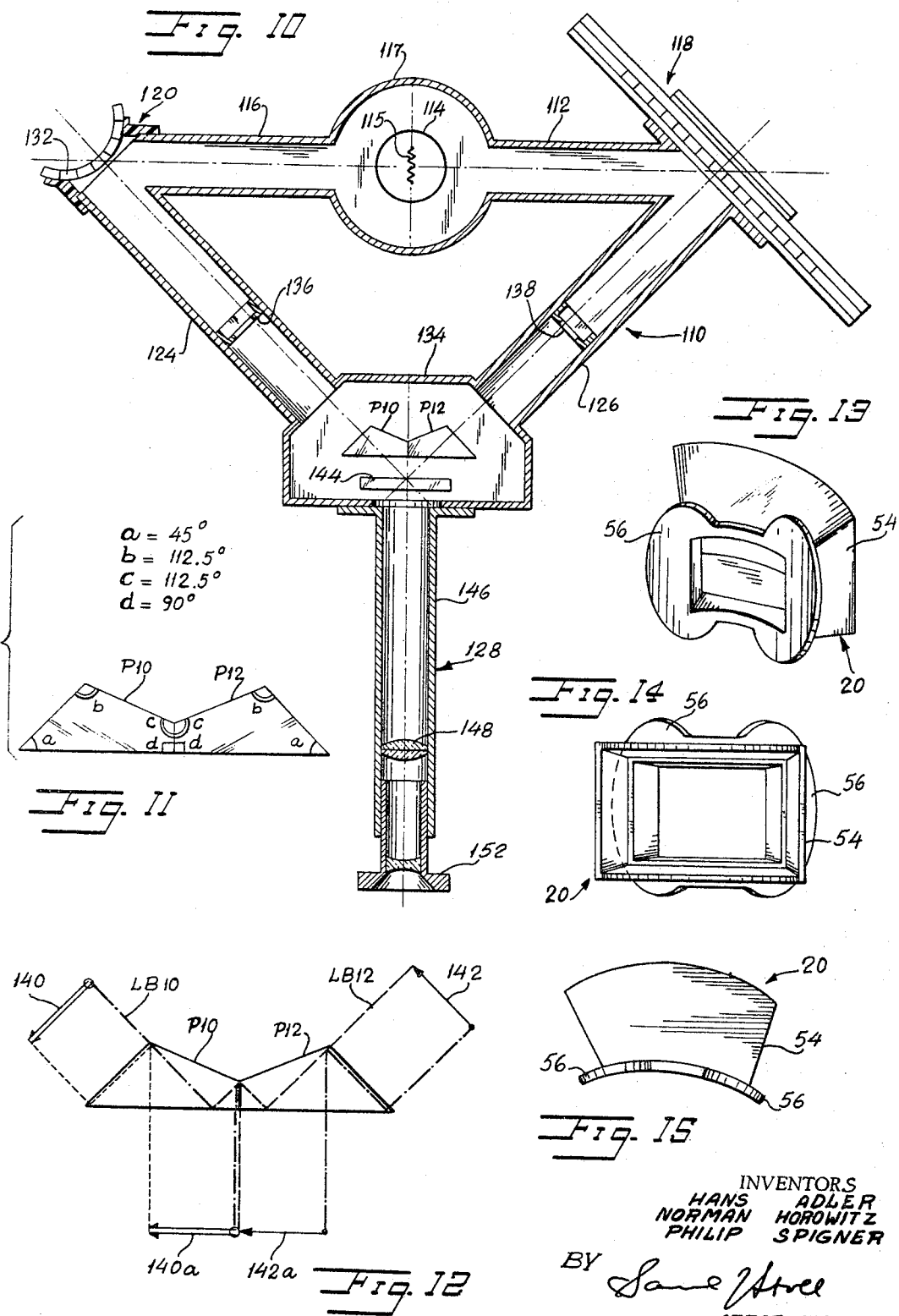

3,436,157
COLOR AND SURFACE STRUCTURE COMPARATOR
Hans Adler, 260 Riverside Drive, New York, N.Y. 10025; Norman Horowitz, 111—21 77th Road, Forest Hills, N.Y. 11375; and Philip Spigner, 1460 Park, St., Atlantic Beach, N.Y. 11509
Filed Apr. 8, 1966, Ser. No. 541,384
Int. Cl. G01j 3/52
U.S. Cl. 356—192                    6 Claims This invention relates to a color and surface structure comparator for dental use. More specifically, the invention comprises an optical instrument for comparing and matching the color and surface structure of objects such as natural and artificial teeth and gums. This application is related to copending patent application Ser. No. 541,-383, filed on Apr. 8, 1966.

In the practice of dentistry and in allied fields such as dental technology it is frequently necessary to compare the color and surface structure of natural and artificial teeth with samples of artificial teeth to be mounted in juxtaposition therewith. An optical device for performing this function is disclosed in the above-mentioned copending patent application, Ser. No. 456,785.

Color and surface structure comparators are known in other industries. They are used, for example, to inspect and compare the plane surfaces of metal plates or sheets. This is a relatively simple procedure for which rather elementary optical apparatus will suffice. Such apparatus is wholly unsuited, however, for highly critical and precise work with non-planar surfaces such as the curved and irregular surfaces of human teeth.

One of the reasons for the inadequacy of conventional color comparators resides in their use of an optical system which produces inconsistently reversed or inverted images. However, when natural and artificial teeth are to be matched, it is important that their images be oriented in precisely the same relationship as the teeth themselves. Thus, the images should be right side up, their proximal and distal sides bearing the same relationship as the proximal and distal sides of the specimens. This would be required for accurate matching of color and surface structure under comparable illumination.

Another problem which conventional color comparators are not required to solve is the problem of background color and general environment. Teeth per se cannot satisfactorily be matched in the absence of a gum tissue background. When teeth are compared without a background or against and entirely foreign or artificial background, the matching effect is entirely unlike that which is produced when the teeth are viewed against a natural gum color background. No such background is provided in conventional color comparators.

An inherent defect or deficiency in all conventional color comparators known to applicants resides in the unequal lengths of their light paths and the differences in number and kind of light reflections and inter-media penetrations. The consequence is that the transmission and reflection losses of light are unequal for the light paths of the specimen and sample objects. Such color comparators are incapable of precise, accurate comparison and matching of non-planar objects, especially those whose surface configurations describe simple and compound curves and grained or striated lines or structures or other irregularities, such as human teeth.

The principal object of this invention is the provision of a color and surface structure comparator capable of precise and accurate dental use.

The principle on which this invention is based is that the optical system must function with equal effect upon both the specimen and the sample. There must be equal illumination, the light paths must be of equal length, and there must be the same number and kind of reflections and inter-media penetrations within the optical system. The images must retain the same relative orientation as the respective objects which produced them. In short, corresponding portions of the two objects must be equally illuminated and equally represented or reproduced in their respective images.

Another important object of this invention is the provision of means for matching corresponding objects in corresponding environments. Thus, the present device is adapted to compare and match natural and artificial teeth against a gum tissue (natural or simulated) background. Simulated oral cavity (tongue) and denture backgrounds enhance the matching effectiveness of the device.

The invention is illustrated in the accompanying drawing, in which:

FIGURE 1 is a horizontal section through an optical instrument made in accordance with one form of this invention, showing the instrument in operative position relative to the teeth of a patient, a sample color guide, and the eye of the attending dentist.

FIGURE 2 is a vertical section on the line 2—2 of FIGURE 1.

FIGURE 3 is another vertical section on the line 3—3 of FIGURE 1.

FIGURE 4 is a fragmentary vertical section on the line 4—4 of FIGURE 1.

FIGURE 5 is a transverse section on the line 5—5 of FIGURE 1.

FIGURE 6 is a transverse section on the line 6—6 of FIGURE 1.

FIGURE 7 is a plane view of the prism system of the optical instrument.

FIGURE 8 is a view of the same prism system, but providing a schematic showing of the light beams which pass through the system.

FIGURE 9 is a circuit diagram of the electrical system of said optical instrument.

FIGURE 10 is a horizontal section similar to that of FIGURE 1, but showing a modified form of the invention.

FIGURE 11 is a plan view of the prism system of said modified form of the invention.

FIGURE 12 is a view of the same prism system, but providing a schematic showing of the light beams which pass through the system.

FIGURE 13 is a perspective view of a mouthpiece used in connection with the present optical instrument.

FIGURE 14 is an end view of said mouthpiece.

FIGURE 15 is a top view thereof.

Figure 8A:
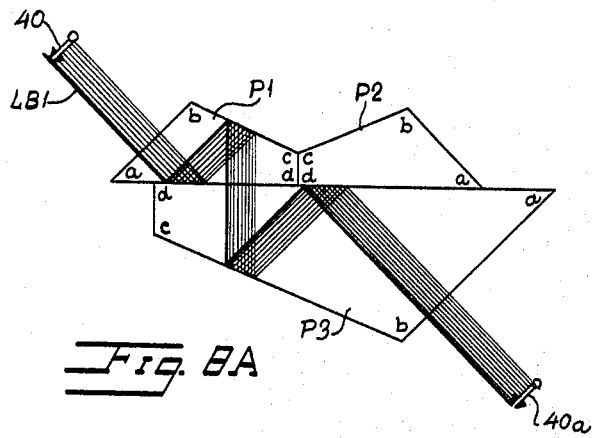
FIGURES 8A and 8B are schematic views of the light paths through the prism system.

Referring now to the details of the first form of the invention, as shown in the accompanying drawing, it will be observed that the optical instrument 10 which is herein claimed comprises a generally triangular, tubular, light-impervious housing 12, a light source 14 mounted within the base 16 of said triangular housing, a color guide 18 mounted at one open base corner of the triangular housing, a mouthpiece 20 mounted at the opposite open base corner of said triangular housing, a prism system 22 mounted within the apex of said triangular housing, between sides 24 and 26 thereof, and a magnifying instrument 28 connected to said apex of the triangular housing.

In operation of this device the patient's mouth 30 is placed against the mouthpiece 20, the patient's teeth 32 abutting the exposed end of said mouthpiece, the patient's lips encompassing the mouthpiece flange in order to exclude ambient light. The teeth are thereby exposed through the mouthpiece to the inside of housing 12. As will shortly be seen, they are exposed to illumination from the light source 14, but ambient light is excluded therefrom. By the same token, a selected portion of color guide 18 is exposed to the light emanating from light source 14, and all ambient light is excluded from that illuminated portion of the color guide.

The light source 14 is mounted within an enlargement 17 formed within tubular base 16 and said light source comprises an incandescent electric light bulb such as a projection bulb adapted for operation at a color temperature of approximately 3000° Kelvin. As will shortly be seen, the present invention includes means for regulating the voltage which is applied to the bulb so as to lower its color temperature within the range of 2400°–3000° K. The incandescent electric light bulb constitutes an incandescent light source which extends across the range of the entire visible spectrum.

It will further be noted that the filament 15 of light source 14 is disposed in a transverse plane which is intersected at right angles by the longitudinal axis A of the tubular base 16 of the triangular housing 12. Additionally, the transverse plane on which the filament is disposed is located precisely midway between corresponding portions of the patient's teeth 32 and the color guide 18. It will be evident that the teeth (which constitute the master specimens of the color matching operation) and the corresponding portions of the color guide (which constitute the color samples of the matching operation) are directly exposed to the light source, receiving equal illumination therefrom. It will also be observed that the patient's teeth (more precisely, a tangent drawn relative thereto) and the color guide 18 are disposed at a 45° angle with respect to the longitudinal axis of the base tube 14 of the triangular housing.

Mounted within the tubular sides 24 and 26 of the triangular housing are diaphragms 36 and 38 or the like. As will shortly be seen, reflected light from the color guide 18 and the tooth specimens 32 pass through these diaphragms to the prism system 22, which will now be described in detail. In this preferred form of the invention the prism system consists of two identical prisms P1 and P2, respectively, and a third prism P3 which has the same angular construction as prisms P1 and P2 but with longer sides. More particularly, each prism defines, in plan view, a four-sided figure having a 45° angle *a*, 112.5° angle *b*, a 112.5° angle *c*, and a 90° angle *d*. See FIGURE 7. As the drawing clearly shows, bases *ad* of the three prisms occupy a common line (a common plane when the three-dimensional aspect of these prisms is taken into account). Prisms P1 and P2 are disposed in mirror-opposite relationship to each other, and prism P3 is disposed in mirror-opposite relationship to both prisms P1 and P2.

It will further be noted in FIGURE 8A that a beam of light LB1 reflected back from a tooth specimen 32 and passing through diaphragm 36 will enter side *ab* of prism P1. This beam will then be reflected off base *ad* and then off side *bc*. It will then emerge from prism P1 through base *ad* and it will enter prism P3 through base *da* thereof. Emergence from prism P1 and entry into prism P3 approximates a right angle with respect to their respective bases *ad*, *da* and consequently there will be a minimum penetration loss of the light beam. Beam LB1 is then reflected off side *bc* of prism P3 and then off base *da* of said prism, and it finally emerges through side *ab*.

Light beam LB2 is reflected off the color guide 18, it passes through diaphragm 38 and then enters prism P2 through side *ab*. It then is reflected off base *da* of prism P2 and then off side *cb*. It then emerges from prism P2 through base *da* thereof, and enters prism P3 through base *da* of that prism. Beam LB2 passes through the bases of prisms P2 and P3 under the same optical conditions as previously mentioned with regard to P1 and P3. Beam LB2 is then reflected off side *bc* of prism P3, then off base *da* of that prism, and it finally emerges therefrom through side *ab*.

Comparing the two light paths of beams LB1 and LB2 it will be noted that they have the same length in the media they pass (glass and air) the same number of reflections and same number of penetrations from air to glass and from glass to air.

Both light beams are submitted to four reflections. This being an even number of reflections, it will produce side-correct images.

The angles of their respective reflections are identical and the media through which they respectively pass are also identical. The three prisms are made of the same optical material.

The result is a pair of adjacent images 40*a* and 42*a*, which correspond to tooth specimen 32 (represented by arrow 40), and color guide 18 (represented by arrow 42). These images have the same orientation as the objects which they represent—that is, they are in right-side-up, side-correct positions. For the purposes of the claims, we shall refer to such images as being "correctly oriented," meaning that they are neither inverted nor reversed in their positions with respect to the objects which they represent.

After the light beams LB1 and LB2 emerge from prism P3, they pass through a light filter 44 and thence through the magnifying instrument 28 to the eye 50 of the viewer. More particularly, magnifying instrument 28 comprises a tubular casing 46 which houses a lens system 48 and a telescopically mounted eye piece 52. The magnifying lens system of instrument 28 is that of a Galilean telescope, which magnifies without inverting the image. Accordingly, the images which are viewed by the operator of the instrument occupy the same relative positions which the objects themselves occupy, namely, the tooth specimen 32 and the color guide 18.

The logic of the optical system will now be understood. Prisms P1 and P2 are identical, and they occupy the same relative positions with respect to the tooth specimen 32 and the color guide 18. Prism P3 is approximately twice the size of prisms P1 and P2, in the sense that base *da* of prism P3 is approximately twice as long as base *ad* of prism P1 and base *da* of prism P2, and the side *ab* of prism P3 is approximately twice as long as sides *ab* and *ba* of prisms P1 and P2, respectively. The reason is that prism P3 must be large enough to transmit the two beams LB1 and LB2 and to accommodate them in side-by-side relationship as they respectively emerge from said *ab* of said prism P3.

Additionally, it will be noted that prism P3 provides the means of deflecting light beam LB2 from its path in tubular side 26 of the triangular housing to its path through tubular casing 46, the two paths extending at right angles to each other. Prism P3 also performs the function of transmitting light beam LB1 in a path through tubular casing 46, which is parallel to its path through tubular side 24, while shifting or offsetting the former path relative to the latter.

This provides an optimum viewing position for the person operating the instrument, particularly in the case of an attending dentist and a patient. The instrument is shown in FIGURE 1 in its horizontal position, so that it may be applied to a patient in a sitting position, while the attending dentist also occupies a sitting position. In the operation of this device, the dentist would be seated directly opposite the patient, facing him while the color guide would be situated off to the side. In the arrangement shown in FIGURE 1, the color guide is situated to the right of the attending dentist (to the left of the patient), but this will be understood to be purely illustrative, and the entire apparatus may be inverted so that the color guide is to the left of the dentist and to the right of the patient.

Referring now to some of the other important details of the first form of this invention (and it will be understood that they apply equally as well to the other form of the invention as hereinafter described), it will be noted in FIGURES 1, 2, 13, 14 and 15 that the mouthpiece 20 comprises a generally flared, tubular section 54 and a concavo-convex flange 56 formed at the smaller end of said flared tubular section 54. The outer surface of said flange 56 is concavely curved to conform to and fit a set of natural or artificial dentures. The outer peripheral configuration of the flange should conform to the inner lip formation, so that the patient may rest his teeth against the concave surface of the flange, while placing his lips against its convex surface. The lips serve to exclude ambient light from the flared tubular section 54.

It will be noted that the flared tubular portion 54 is internally stepped to receive the open merging ends of tubular base portion 16 and tubular side member 24. A light seal is accordingly formed between the mouthpiece 20 and tubular members 16 and 24.

It will be understood from the foregoing that mouthpiece 20 performs several important functions. Thus, it serves as a positioning member for positioning the patient's teeth with respect to the light source and the prism assembly. It also serves as a light screen which excludes ambient light from the internal parts of the instrument. Furthermore, it performs the obvious sanitary function of providing each patient with his own sterile means of contact with the instrument. In this connection it should be pointed out that the mouthpiece may be made in two forms: In the first place, it may be made of disposable material, so that each patient is provided with his own personal mouthpiece, which is discarded after a single use. In the second place, the mouthpiece may be made of more permanent material but of a type suited for sterilization in an autoclave or by other conventional sterilizing means used in dental offices. The mouthpiece may be molded of a durable plastic material such as the phenol-formaldehyde resins which are sold under the trademark Bakelite. The material should have a high melting point, so that it may be sterilized at high temperatures. It should also be inert to the alcohols and other chemical solutions which are used for sterilizing purposes. On the other hand, it may be molded of any of the foam expansion-type plastics which are conventionally used in the making of disposable articles such as drinking cups and the like. As is indicated in FIGURES 1 and 2, mouthpiece 20 may be mounted on the triangular housing by simply slipping it on, and it may equally as readily be removed therefrom by slipping it off. This feature of removability also applies to light filter 44. As is shown in FIGURE 2, the light filter may be removed and replaced as desired and as required for different light filtering effects. The light filter may be inserted through opening 33 into the housing enlargement 34, in which the prism assembly is mounted. A channel 35 is provided in the bottom wall of said housing enlargement to receive and position the light filter.

It will further be observed that the color guide 18 (sometimes designated "shade guide") is slidably mounted at the merging open ends of tubular base portion 16 and tubular side 26. This is best seen in FIGURE 3. The color guide is provided with a plurality of artificial tooth specimens 60 of different shades of color. Behind and above the specimen teeth 60 is a background element 62 colored a shade of pink to simulate a human gum tissue. Behind and below the specimen teeth is a background element 64 which is colored a somewhat darker pink to simulate the oral background. Below the specimen teeth is a tooth-colored background element 65 simulating the opposing teeth. The color guide may be shifted longitudinally of itself, to expose its various tooth specimens 60 to the light source 14 and the prism system 22.

Turning now to FIGURE 9 and to the circuit diagram of the instrument hereinabove described, it will be observed that bulb 14 is connected by means of suitable conductors and electric cord 66 to a source of electric current. The bulb is provided with lugs 68 for insertion into a bayonet slot type socket. A rheostat 70 is provided for voltage regulation and voltmeter 72 is provided to measure the voltage which is applied to the bulb filament. A motor driven fan 74 is provided to circulate air as a coolant with respect to the light source. Suitable switches 76, 78 and 80 are provided in the circuit, switch 76 being a double pole, single throw toggle switch or equivalent, and switches 78 and 80 being single pole, single throw toggle switches or equivalent. A typical installation would involve the use of a 120-volt, 60-cycle power source. As has above been indicated, a 110-watt, 120-volt projection lamp of the type used in motion picture projectors may be used as the light source of the present device. A variable rheostat may be used as the voltage regulator. The circuit is elementary and is shown for illustrative purposes only. Switch 76 is the master switch of the entire device. Switch 78 relates to the voltmeter.

Referring now to the second form of this invention and to FIGURES 10, 11, 12 and 12A, it will be observed that a color comparator is provided which bears considerable resemblance to the one above described. However, there are some variations, and they will now be described.

Essentially, the color comparator 110 which constitutes the second embodiment of this invention comprises a generally triangular, tubular enclosure including tubular base portions 112 and 116 and enlargement 117 between them. Light source 114 is mounted within said enlargement, and its filament 115 is disposed in a plane to which the common longitudinal axis of tubular base portions 112 and 116 is perpendicular. Tubular sides 124 and 126 of said triangular housing merge with the outer ends of tubular base portions 116 and 112, respectively, to form the base corners of the triangular housing. At one base corner is the color guide 118 and at the other base corner is a mouthpiece 120 against which a natural or artificial denture 132 is placed.

At the apex of the triangular housing is an enclosure 134 to which tubular sides 124 and 126 are connected, and with which they communicate. A magnifying assembly 128 is also attached to and communicates with said enclosure 134, and it will be observed that the relationship of said magnifying assembly to tubular arms 124 and 126 is that of the upright to the arms of the capital letter Y. The magnifying assembly 128 comprises a tubular housing 146, a lens system 148 within said tubular housing, and an eyepiece 152 telescopically connected to said tubular housing 146. The magnifying system is that of a Galilean telescope, which produces images in right-side-up and side-correct relationship.

The prism system of this second form of the invention consists of only two prisms, P10 and P12, which are identical with prisms P1 and P2 in the first form of the invention. Not only are these prisms identical with those previously used, but they are also oriented in precisely the same relationship to each other and to the color samples and the tooth specimens. It will thus be seen that FIGURE 11 is identical with FIGURE 7 except for the omission of prisms P3, prisms P10 and P12 being identical with P1 and P2. Similarly, FIGURE 12 is identical with FIGURE 8, except for the omission of prism P3 and the light paths through said prism, prisms P10 and P12 being identical with P1 and P2 and their respective light paths.

Figure 8B:
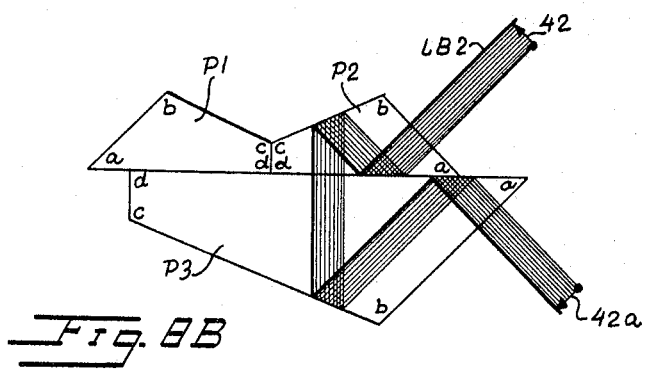
Figure 12A:
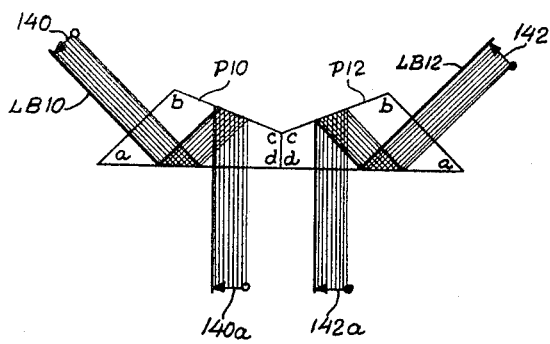
FIGURE 12A is a schematic view of the light paths through the prism system.

Referring now to FIGURE 12A, it will be observed that the light beams LB10 and LB12 pass through prisms P10 and P12 in precisely the same manner and direction as light beams LB1 and LB2 passing through prisms P1 and P2, as shown in FIGURES 8A and 8B. Thus, arrows 140 and 142 (which correspond to the tooth specimen 132 and the color guide 118, respectively) are represented by a pair of images situated in side-by-side relationship, right side up and sides correct, as indicated by arrows 140A and 142A. It will be understood that these arrows last mentioned are spaced from each other only for purposes of clarity. The images which the prism system produces and which the attending dentist views through the magnifying system are situated in side-by-side relationship in close proximity to each other (see FIGURE 12). The schematic view of the light beams (see FIGURE 12A) is intentionally made unrealistically narrow, so that their respective paths may readily be delineated and followed.

The foregoing is illustrative of preferred forms of the invention. It will be clearly understood that variations and modifications of the disclosed device may be provided, within the broad spirit of the invention and the scope of the appended claims.

What is claimed is:

1. A dental color and surface structure comparator, comprising:
   a light source,
   a color guide, and
   an optical system ;
   means for positioning said color guide for exposure to said light source and optical system;
   means for positioning a dental specimen for exposure to said light source and optical system;
   said optical system being adapted to produce adjacent correctly oriented images of said color guide and dental specimen for visual comparison;
   said optical system including at least two diversion prisms;
   the prism angles being 45°, 90°, 112.5° and 112.5°, respectively.

2. A dental color and surface structure comparator in accordance with claim 1, wherein:
   the optical system including two such prisms positioned in abutment with each other, their 90° angles being adjacent each other to form a 180° angle, their 45° angles being remotely situated from each other.

3. A dental color and surface structure comparator in accordance with claim 1, wherein:
   the optical system including three such prisms positioned in abutment with each other, their 90° and 45° angles being all situated on a common line.

4. A dental color and surface structure comparator, comprising:
   a light source,
   a color guide, and
   an optical system;
   means for positioning said color guide for exposure to said light source and optical system; and
   means for positioning a dental specimen for exposure to said light source and optical system;
   said optical system being adapted to produce adjacent correctly oriented images of said color guide and dental specimen for visual comparison;
   said optical system including at least two diversion prisms;
   a first ambient light-excluding enclosure for the light source, one end of said enclosure being open to the color guide, the opposite end being open to the dental specimen,
   a second ambient light-excluding enclosure for the optical system, one end of said second enclosure being open to the color guide and to the first mentioned end of the first enclosure, the opposite end of said second light-excluding enclosure being open to the dental specimen and to said opposite end of the first mentioned enclosure; and
   the second light-excluding enclosure having a third opening through which the images may be viewed.

5. A dental color and surface structure comparator in accordance with claim 4, wherein:
   said optical system including an image magnifying lens system associated with said third opening in the second ambient light-excluding enclosure.

6. A dental color and surface structure comparator in accordance with claim 4, wherein:
   an ambient light-excluding mouthpiece attached at said opposite end of the first mentioned enclosure, said mouthpiece being adapted to be received in the mouth of a dental patient, whereby the patient's teeth rest against a portion of said mouthpiece to serve as dental specimens in the comparator and to be properly positioned relative thereto, and whereby the patient's lips surround said portion of the mouthpiece in order to exclude ambient light from said first mentioned enclosure.

References Cited

UNITED STATES PATENTS

| | | |
|---|---|---|
| 2,333,795 | 11/1943 | Kellerman et al. |
| 2,386,878 | 10/1945 | Nickerson. |
| 2,805,478 | 9/1957 | Adams. |
| 2,884,926 | 5/1959 | Grasso. |

OTHER REFERENCES

Myerson: J. Am. Dental Assoc., v. 27, Aug. 8, 1940, pp. 14–15.

JEWELL H. PEDERSEN, *Primary Examiner.*

WARREN A. SKLAR, *Assistant Examiner.*

U.S. Cl. X.R.

32—71; 35—28.3; 128—2